June 3, 1930.   E. V. J. TOWER   1,761,374
STEERING WHEEL
Filed April 14, 1927
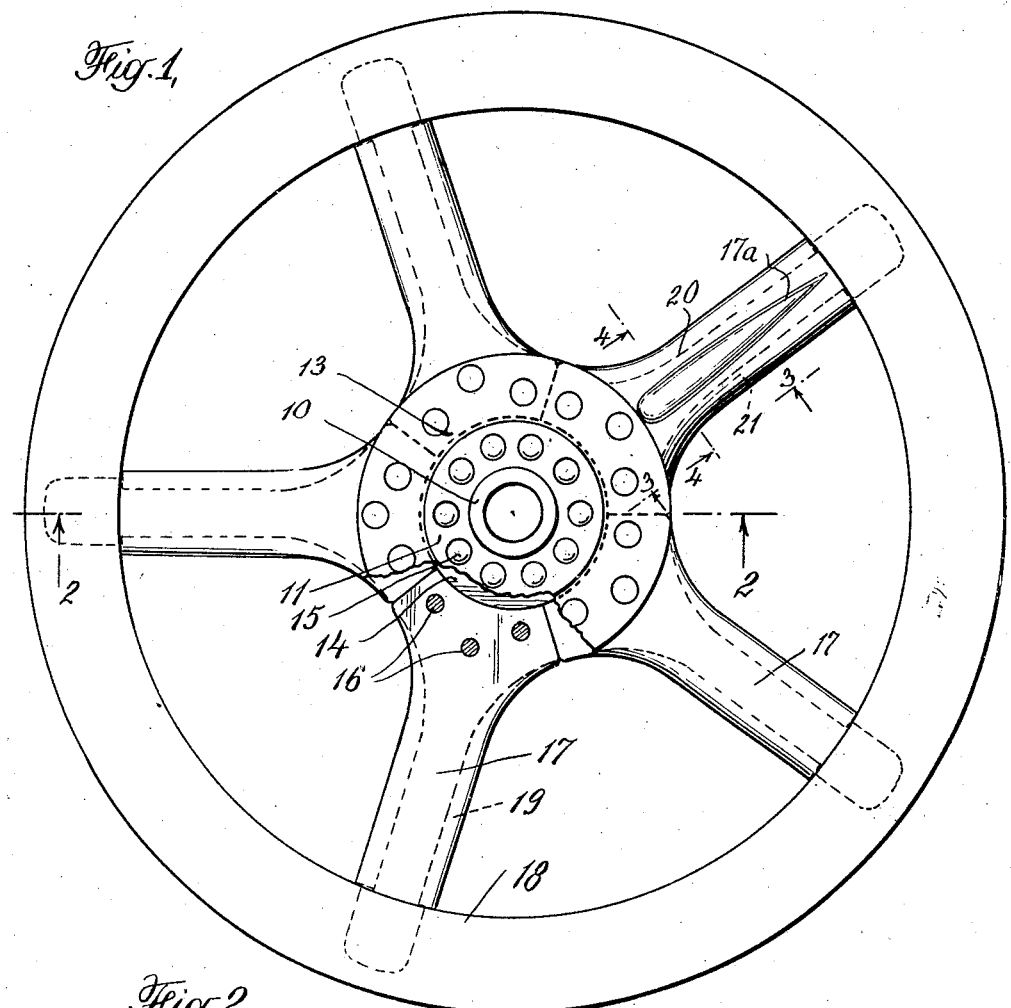
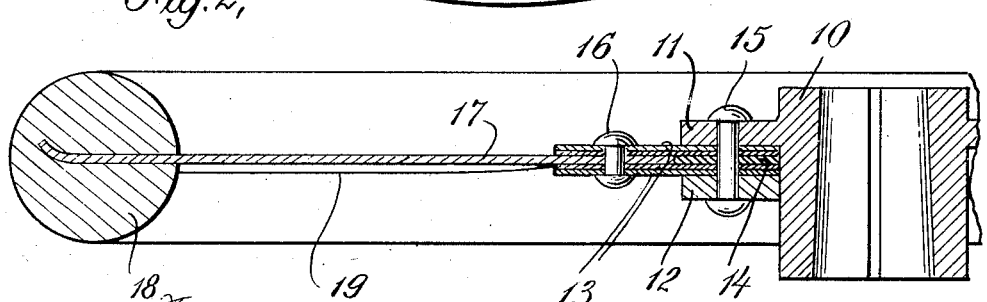
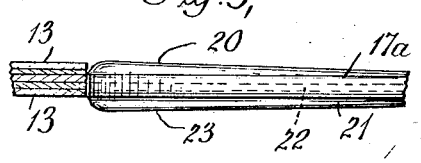
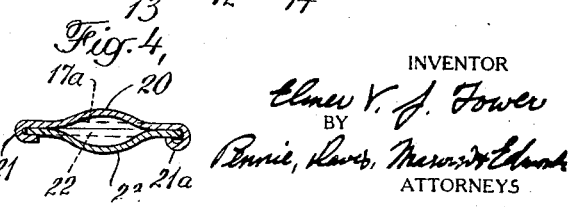
INVENTOR
Elmer V. J. Tower
BY
ATTORNEYS Patented June 3, 1930

1,761,374

UNITED STATES PATENT OFFICE

ELMER V. J. TOWER, OF NORTH SYRACUSE, NEW YORK, ASSIGNOR TO RUSSELL MANUFACTURING COMPANY, OF MIDDLETOWN, CONNECTICUT, A CORPORATION OF CONNECTICUT

STEERING WHEEL

Application filed April 14, 1927. Serial No. 183,650.

This invention relates to steering wheels for automobiles and other road vehicles, and is concerned more particularly with the provision of a steering wheel for this purpose which is arranged to absorb shocks and to dampen vibration.

The steering mechanism now commonly used in automobiles is so constructed that road shocks due to irregularities in the road surface are transmitted through the steering post to the wheel, so that throughout the operation of the car the wheel is continually jarred and vibrated. This effect is increased with some types of steering mechanism when balloon tires are used, since these tires have a greater surface in contact with the road and exert a tractive effort so that the wheels respond more quickly to unevenness in the surface. The usual steering wheel consisting of a hub mounted on the steering column and the spoked wheel secured thereto is so rigid that the vibration of the wheel is tiring to the driver, but heretofore, so far as I am aware, no steering wheels have come into use commercially in which attempts have been made to overcome this vibration effect except by constructing the entire wheel of wood.

The wheel of the present invention affords numerous advantages over those heretofore used, in that the spokes of the wheel have a certain degree of flexibility so that they can absorb jars and shocks, and in addition, these spokes are not secured directly to the hub, but by a cushioning member which is interposed between the spokes and the hub. This new construction permits the wheel to yield sufficiently to relieve the strain on the driver in passing over an uneven surface without reducing the desired rigidity in the plane of movement of the wheel when the steering mechanism is being operated. The new wheel is constructed of metal parts which are largely duplicates of each other, so that it can be produced at a low cost and the parts used are few in number and easily assembled.

In the new wheel, the usual hub is employed which is connected to the steering post and the rim is secured to this hub by a plurality of spokes of sheet metal. The hub has a flange to which the spokes are connected by means of washers or rings, the inner ends of the spokes being connected between pairs of the rings, which are in turn connected to the hub flange. The spokes terminate at a point spaced from the hub and are not directly connected thereto. Between the ends of the spokes and the outer face of the hub is interposed a ring of yieldable material which serves to center the spokes and prevents the direct transmission of shocks from the post to the spokes. The spokes are flexible about an axis lying in their plane and their mounting is similarly flexible, so that the wheel can yield in a direction parallel to the axis of the steering post. Each spoke is secured at one end to the rim and at its other end is enlarged so that the group of spokes form a secondary hub spaced from the main hub on the steering column by the yieldable washer previously mentioned. The enlarged hub ends of the spokes lie in contact and thus support each other and provide a structure which is rigid in the plane of the spokes, thus giving the desired strength and rigidity in the plane of movement of the wheel for steering purposes.

The new steering wheel embodies numerous other features of novelty which permit the parts to be produced and assembled at a low cost.

For a better understanding of the invention, reference may be had to the accompanying drawings showing one form of embodiment of the invention. In these drawings:

Figure 1 is a plan view of the new steering wheel;

Fig. 2 is an enlarged radial section taken along the line 2—2 of Fig. 1;

Fig. 3 is a modified form of spoke construction; and

Fig. 4 is a cross-section thereof taken along the line 4—4 of Fig. 1.

Referring to the drawings, the steering wheel is mounted on the steering post, not shown, by means of hub 10 and locked in place by any suitable means such as a nut, cotter pin or the like. Hub 10 may be a light casting stamping or forging, and is provided with an integral flange 11 which imparts the necessary strength to the hub. A ring 12 fits over hub 10 and coacts with flange 11 to enclose a plurality of radially rigid but axially flexible washers 13 of metal or the like, between which is disposed a washer 14 of yieldable non-metallic shock-absorbing material. Rivets 15 or bolts are used to hold washers 13 and 14 securely clamped between hub flange 11 and ring 12.

Also clamped between flexible washers 13 and held in place by rivets 16 or the like, is a series of flexible radial spokes 17, the outer ends of which are moulded in or otherwise fastened to the rigid steering rim 18 made of any suitable material. The outer tips of the spokes are reduced in width where they enter the rim 18 and are preferably upset as shown in Fig. 2 in order to facilitate moulding of the rim 18 around them with a firm mechanical bond. Spokes 17 are interchangeable and are preferably stamped from flexible sheet metal. The hub ends of the spokes are enlarged so as to make a complete circle when assembled, the hub end of each spoke lying in lateral contact with the hub ends of the adjacent spokes so that each spoke is laterally braced by each adjacent spoke. This makes a structure which is rigid in the plane of the spokes, but due to the flexibility of the spokes and washers, is flexible at an angle to the plane of the spokes. In order to provide a smooth and rounded edge for the spokes at points where they might be grasped by the driver of the vehicle, flanges 19 are left along each edge of the spoke blanks, which are subsequently folded over to form a rounded edge as shown. If desired the hub structure may be covered by a cap to conceal the rivets and give the wheel a more attractive appearance.

This steering wheel structure provides one point of flexibility at the junction of washers 13 and 14, a second point of flexibility at the junction of washers 13 and spokes 17, while further flexibility is secured due to the light construction of spokes 17. The yieldable washer 14 absorbs the shocks which are not absorbed by the flexible structure, and in addition serves to centralize the spokes with reference to the hub 10, thus simplifying assembling operations.

The spokes and other portions of the wheel may be variously shaped to conform to different requirements. For example, the spokes may be bent with respect to the plane of the rim to form an inwardly or outwardly dished wheel instead of the straight wheel illustrated in the drawings. Furthermore, the rim may be polygonal in cross-section or shape instead of circular as illustrated, and may be provided with finger-grooves or the like, and otherwise conform to standard practice in steering-wheel construction.

Figs. 3 and 4 illustrate a modified form of spoke comprising two parts, the upper part 17$^a$ resembling spokes 17 but formed with a convex bulge 20 extending from the hub to the rim, and continuous flanges 21 along the edges, which are crimped around the corresponding edges of the lower part or auxiliary spoke 22, also provided with a similar convex bulge 23. As shown in Figs. 1 and 3, the lower part 23 of the spoke is free at both ends and forms with the upper part 17$^a$ a comfortable grip for the hand of the driver. The flanges 21 of spoke 17$^a$ may be tightly crimped around the edges of auxiliary spoke 23, or they may be crimped so as to form a bead 21$^a$, both alternative forms being illustrated by Fig. 4.

During the operation of the motor car provided with this new steering wheel, the shocks and jars due to irregular road surfaces are taken up by the flexibility of the spokes and their mountings so that little of such vibration is transmitted to the rim itself. The shocks are likewise absorbed in the washer 14 which lies between the ends of the spokes and the hub flange. The spokes are rigid in their plane and are supported and braced by one another so that the flexibility of the structure in no way interferes with the movement of the steering post required to turn the vehicle.

The new steering wheel consequently provides numerous advantages over present standard steering wheels, and secures greater pleasure and comfort to the driver of automobiles or other similar vehicles.

I claim:

1. A steering wheel comprising a rim, a hub, spokes connected to the rim, metal washers secured to the hub and spokes, and a non-metallic member interposed between the hub ends of the spokes and the hub.

2. A steering wheel comprising a rim, a hub, spokes connected to the rim, the hub ends of the spokes being shaped to encircle the hub, and radially rigid but axially flexible means connecting the hub ends of the spokes to the hub.

3. A steering wheel comprising a rim, a hub, spokes connected to the rim, the hub ends of the spokes being formed so that they together encircle the hub and are spaced therefrom, yieldable material disposed in the space between the hub ends of the spokes and the hub, and washers connected to the spokes and hub to enclose the yieldable material.

4. A steering wheel comprising a rim, a hub, spokes connected to the rim, the hub ends of the spokes together encircling the hub but spaced therefrom, radially rigid washers connecting the hub ends of the spokes to the hub, and yieldable material disposed between the hub ends of the spokes and the hub, said material being held in place by the connecting washers.

5. A steering wheel comprising a rim, a hub, flexible spokes connected to the rim, radially rigid washers mounting the spokes on the hub, and yieldable material held in place by the washers and separating the hub ends of the spokes from the hub.

6. A steering wheel comprising a rim, a hub, spokes connected to the rim, flexible metal washers mounting the spokes on the hub, and yieldable material enclosed by the washers and separating the hub ends of the spokes from the hub.

7. A steering wheel comprising a rim, a hub, a plurality of spokes extending between the hub and the rim, metallic washers at the hub for securing the spokes thereto, and yieldable material fastened to the hub and extending between the washers, this material being arranged to absorb vibration.

8. A steering wheel comprising a rim, a hub having an encircling flange, a plurality of spokes providing a mounting for the rim, flexible metal washers connecting the inner ends of the spokes together and a collar on the hub connected to the washers and to the flange.

9. A steering wheel comprising a rim, a hub, a plurality of spokes connected to the hub and the rim, auxiliary spokes connected to the first-named spokes only, and shock absorbing means disposed between the hub ends of the first-named spokes and the hub.

10. A steering wheel comprising a rim, a hub, and a structure consisting of a plurality of flexible spokes connected to the rim, flexible washers connecting the spokes and the hub, said structure being rigid in a plane parallel to the plane of the rim and non-rigid in a direction at an angle to the plane of the rim.

11. A steering wheel comprising a rim, a hub, spokes connecting the rim and hub, and auxiliary spokes attached to said first-named spokes but free of the hub and rim.

12. A steering wheel comprising a rim, a hub, a plurality of spokes connected to the rim, radially rigid means securing each spoke to the hub, and yielding means interposed between the hub ends of the spokes and the hub, and lying in the plane of the spokes, the hub end of each spoke bearing against said yielding means.

13. A steering wheel comprising a rim, a hub, a plurality of spokes connected to the rim, the hub ends of the spokes being spaced from the hub, a yielding means interposed between the hub and the hub ends of the spokes in the plane of the spokes only, and radially rigid means securing the spokes to the hub.

14. A steering wheel comprising a rim, a hub, a plurality of spokes connected to the rim, radially rigid means engaging the hub and each face of each spoke and secured to the hub and the spokes for holding them together, the hub ends of the spokes being spaced from the hub, and a quantity of yielding material interposed between the hub ends of the spokes and the hub.

15. A steering wheel comprising a rim, a hub, a plurality of spokes connected to the rim, connecting means between the spokes and the hub, said means being flexible in the direction of the axis of the hub and rigid in the plane of the wheel, the hub ends of the spokes being spaced from the hub, and yieldable material between said hub ends and the hub.

In testimony whereof I affix my signature.

ELMER V. J. TOWER.